L. L. GREGG, Jr.
VEHICLE WHEEL.
APPLICATION FILED DEC. 5, 1910.

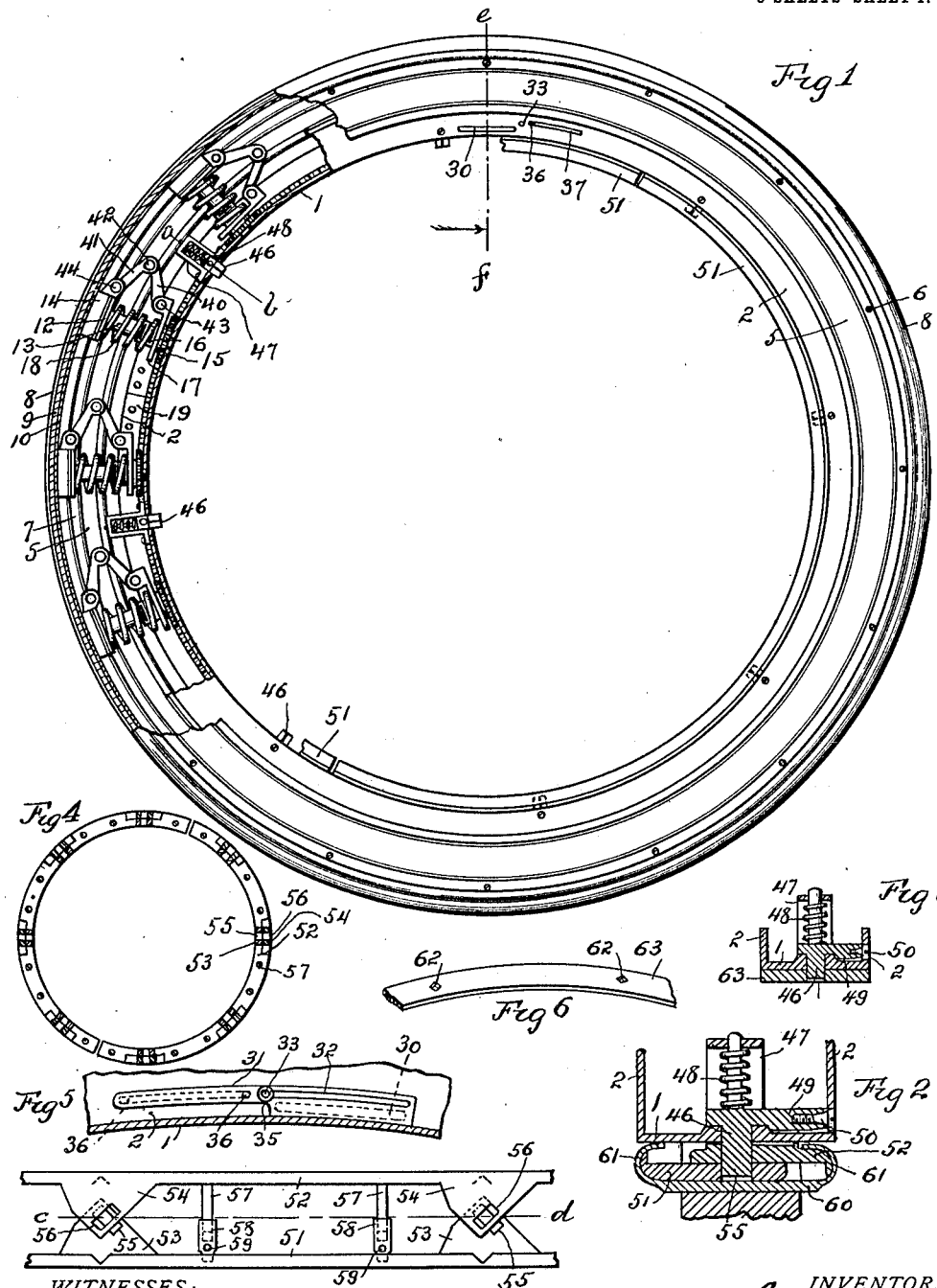

1,020,977.

Patented Mar. 26, 1912.

3 SHEETS—SHEET 2.

WITNESSES:
R.E.Hamilton
E.B.House

INVENTOR.
Luther L. Gregg Jr,
BY
Warren D. House
His ATTORNEY.

L. L. GREGG, Jr.
VEHICLE WHEEL.
APPLICATION FILED DEC. 5, 1910.
1,020,977.
Patented Mar. 26, 1912.
3 SHEETS—SHEET 3.
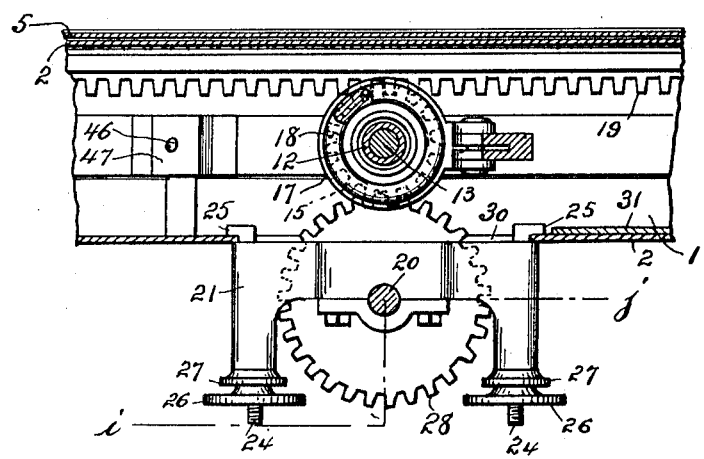
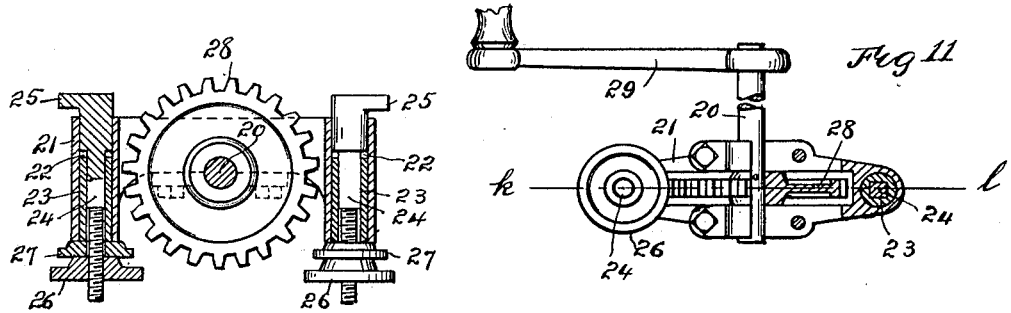
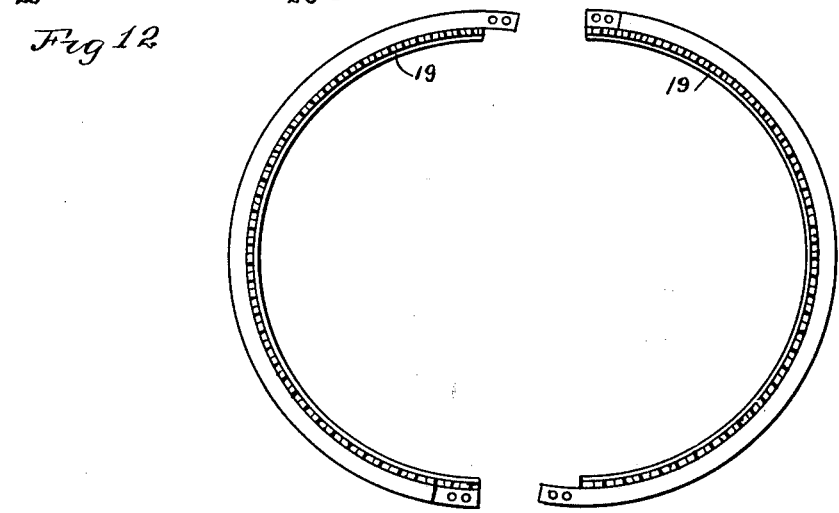
WITNESSES:
R. E. Hamilton
E. B. House
INVENTOR.
Luther L. Gregg Jr.
BY Warren D. House
His ATTORNEY.

UNITED STATES PATENT OFFICE.

LUTHER L. GREGG, JR., OF LONEJACK, MISSOURI.

VEHICLE-WHEEL.

1,020,977.  Specification of Letters Patent.  Patented Mar. 26, 1912.

Application filed December 5, 1910. Serial No. 595,715.

*To all whom it may concern:*

Be it known that I, LUTHER L. GREGG, Jr., a citizen of the United States, residing at Lonejack, in the county of Jackson and State of Missouri, have invented certain new and useful Improvements in Vehicle-Wheels, of which the following is a specification.

My invention relates to improvements in vehicle wheels.

The object of my invention is to provide a device which may be substituted for the ordinary pneumatic tire, and which will be more durable than the pneumatic tire, and will not be liable to punctures.

Other features of my invention are hereinafter more fully described.

Figure 8:
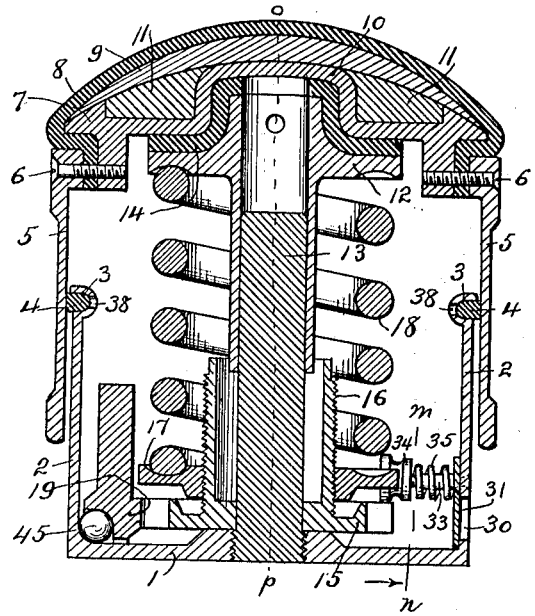
Figure 9:
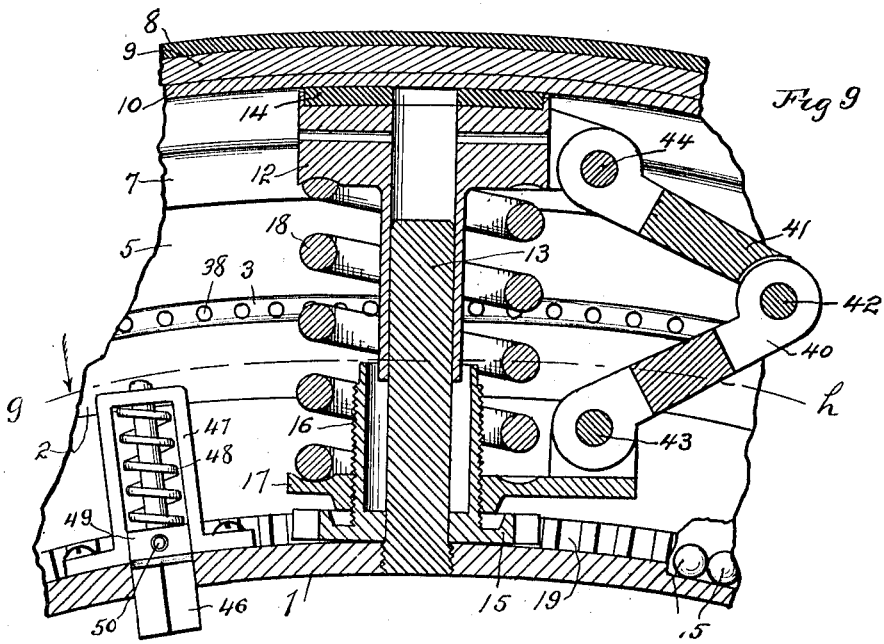

In the accompanying drawings which illustrate my invention, Figure 1 is a view, partly in side elevation and partly broken away, of my improvement provided with a supplemental rim for employment in connection with "clencher" rims. Fig. 2 is a transverse sectional view on the dotted line $a-b$ of Fig. 1, a portion of a "clencher" rim being shown. Fig. 3 is an enlarged plan view of a portion of the supplemental rim which is employed to secure the device to a "clencher" rim. Fig. 4 is a vertical sectional view, reduced, taken on the plane of the dotted line $c-d$ of Fig. 3, of the supplemental rim which is employed to secure the device to a "clencher" rim. Fig. 5 is a vertical sectional view taken on the dotted line $m-n$ of Fig. 8, showing a portion of the inner rim and the closure for the slot therein. Fig. 6 is a perspective view of a portion of an ordinary flat rim having radial holes for receiving the locking bolts hereinafter described. Fig. 7 is a cross section similar to that shown in Fig. 2, showing the inner rim attached to an ordinary flat rim, such as is shown in Fig. 6. Fig. 8 is an enlarged cross section on the dotted line $e-f$ of Fig. 1. Fig. 9 is a fragmental vertical sectional view on the dotted line $o-p$ of Fig. 8. Fig. 10 is a sectional view taken on the curved dotted line $g-h$ of Fig. 9, showing attached to the inner rim the mechanism by which the operator rotates the gear wheels for changing the tension of the coil supporting springs hereinafter described. Fig. 11 is a view partly in side elevation and partly in section of the detachable wheel turning mechanism, the section being taken on the dotted line $i-j$ of Fig. 10. Fig. 12 is a horizontal sectional view on the dotted line $k-l$ of Fig. 11. Fig. 13 is a side elevation, reduced, of the circular rack, the two members of which are shown detached from each other.

Similar reference characters denote similar parts.

1 denotes the inner rim having parallel outwardly extending flanges 2, each provided on its outer side with an annular groove 3 in which is mounted packing material 4. The two rings 4 of packing material bear respectively against the inner sides of two annular plates 5, which are secured by screws 6 to and serve as flanges on the outer rim 7 which encircles and is movable toward and from the rim 1.

A tire 8, which may be of any suitable material, such as leather or rubber, is mounted on resilient filling material 9 which rests upon the outer periphery of the outer rim 7. The filling material 9 may be of any desired material, such as canvas, soft rubber, or leather. The rim 7 is provided with a central raised portion 10 which forms an annular projection on the outer side of the rim 7 and an annular groove on the inner side of the rim 7. At each side of the raised portion 10 on the outside of the rim 7 is a groove in which is fitted filling rings 11, preferably, of wood, and which furnish a support for the filling material 9.

Within the central annular groove on the inner side of the rim 7 are mounted a plurality of sleeves 12, which are slidable respectively toward and from the rim 1 on a plurality of radial outwardly extending studs 13 the inner ends of which are preferably screw threaded and fitted in screw threaded radial holes provided at regular intervals around the rim 1 in the middle thereof.

Inserted between and bearing against the rim 7 and the outer sides of the sleeves 12 are provided cushion plates 14 of some resilient material, such as soft rubber or leather.

Rotatively mounted on the studs 13 respectively are gear wheels 15 having screw threaded hubs 16 on which are respectively rotatively fitted nuts 17, which respectively support the inner ends of a plurality of coil springs 18 which encircle the studs 13 respectively and have their outer ends bearing respectively against the sleeves 12.

When the gear wheels 15 are rotated, the hubs 16 of the said wheels will turn in the nuts 17, thereby moving the nuts inwardly or outwardly depending upon the direction of rotation of the gear wheels, and changing the tension of the coil springs 18.

For the purpose of simultaneously rotating all the gear wheels 15, when one of said wheels is rotated, I preferably provide a circular rack consisting of two semicircular members 19 the ends of which are secured together by any suitable fastening means.

The circular rack is revolubly mounted on the rim 1 between the flanges 2 and meshes with the gear wheels 15. When one of the gear wheels 15 is rotated, the rack is revolved, thereby rotating the other gear wheels.

For the purpose of rotating one of the gear wheels 15 I preferably provide the following described mechanism: A shaft 20 is rotatively mounted in a support comprising a plate 21 having two parallel circular holes 22 in which are rotatively mounted respectively two sleeves 23 having longitudinal square holes in which are fitted squared portions of two pins 24 one set of ends of which are screw threaded, and the other set of ends of which are provided with lateral projections 25. Nuts 26 are respectively fitted on the threaded portions of the pins 24, and bear respectively against washers 27 encircling the pins 24 and bearing against the plate 21. Secured to and rotatable with the shaft 20 is a gear wheel 28. The shaft 20 has secured to it a crank 29 by which the operator may rotate said shaft.

As shown in Figs. 1, 5, 8 and 10, one side flange 2 of the rim 1 is provided with a slot 30 adapted, as shown in Fig. 10, to receive the gear wheel 28 and the ends of the pins 24 having the lateral projections 25. In mounting the parts as shown in Fig. 10, the nuts 26 are first loosened, and the pins 24 are then turned to positions diametrically opposite to what is shown in Figs. 10 and 12. The pins 24 may then be inserted through the slot 30, after which they are turned to the positions shown in Figs. 10 and 12 and the plate 21 is placed against the outer side of the adjacent flange 2. The nuts 26 are then turned on the pins 24 so as to tightly draw the projections 25 against the inner side of the adjacent flange 2. The gear wheel 28 at this time will mesh with the adjacent gear wheel 15, so that upon rotation of the shaft 20 by the crank 29 the gear wheel 28 and the one with which it meshes will be rotated, thus rotating the other gear wheels 15 by means of the circular rack members 19. After the springs 18 have thus been adjusted as to tension, the nuts 26 are turned so as to release the pins 24 from engagement with the adjacent flange 2, after which the pins 24 are turned so as to permit the passage outwardly through the slot 30 of the projections 25.

The slot 30 is normally closed by a plate 31 which is provided with a longitudinal slot 32 and is mounted on the inner side of the flange 2 having the slot 30. A transverse horizontal stud 33 extends through the slot 32 and has one end secured to the adjacent flange 2. The other end of the stud 33 is screw threaded and has mounted on it a nut 34 against which bears one end of a coil spring 35 which encircles the stud 33 and has its other end bearing against the plate 31, thereby holding the said plate against the adjacent flange 2. To move the plate 31 to and from the closed position, it has secured to it a horizontal pin 36 which extends outwardly through a slot 37 provided in the flange 2 having the slot 30.

For the purpose of keeping the parts well lubricated, the space between the rims 1 and 7 may be filled or partly filled with oil, which may be inserted through the slot 30, when the closure plate 31 is moved to the open position.

The flanges 2 may be provided with oil holes 38 communicating with the annular grooves 3. The sleeves 12 may also be each provided with transverse oil holes 39 communicating with the longitudinal hole in the sleeve.

For preventing relative rotation of the sleeves 12 and nuts 17 and yet permitting inward and outward movement of the sleeves 12 on the studs 13, any suitable means may be employed. For this purpose I have shown a plurality of pairs of plates 40 and 41 which have one set of ends pivoted to each other by horizontal transverse pins 42, and the other set of ends of which are respectively pivoted to the nuts 17 and sleeves 12 by horizontal transverse pins 43 and 44 respectively.

To support the rack members 19, I preferably employ rollers preferably spherical and denoted by 45, which are located between the rack members 19 and the rim 1, as shown in Figs. 8 and 9, and which are supported by said rim.

To releasably lock the rim 1 to another rim of a wheel, the rim 1 is provided with a plurality of radial holes in which are radially slidably mounted respectively a plurality of locking bolts 46 which extend respectively through U shaped guide plates 47 the arms of which are secured to the outer periphery of the rim 1. Coil springs 48 respectively encircle the bolts 46 and have one set of ends bearing against the guide plates 47 respectively and the inner ends of which respectively bear against the bolts 46. The tension of the springs 48 is such that the bolts 46 are normally forced to the locking position shown in Figs. 2, 7 and 9. To releasably secure the bolts 46 in the locking position, the bolts are provided with lateral projections 49 the outer ends of which are provided with horizontal screw threaded holes in which are removably respectively fitted screws 50 which extend respectively through holes provided in the adjacent flange 2 of the rim 1.

To secure the device to a rim of the clencher type, I provide a supplemental rim shown in Figs. 1, 2, 3 and 4. This rim is composed of two semicircular members 51 disposed respectively opposite to and adjustable toward and from two semicircular members 52. The members 51 are provided with horizontal projections 53 which overlap similar projections 54 provided on the members 52. The projections 53 are provided respectively with slots 55 which register with and are disposed at right angles to the slots 56 which are provided in the projections 54. Horizontal studs 57 are secured to the members 52 at one set of ends, the other set of ends being screw threaded and respectively fitted in screw threaded holes provided in the adjacent ends of horizontal pins 58 which are rotatively mounted in the members 51. The pins 58 are provided each with a transverse hole 59 in which may be inserted any suitable instrument, not shown, for the purpose of turning the pin so as to move the members 51 toward or from the members 52.

The "clencher" rim, shown in Fig. 2, and denoted by 60 is provided with two peripheral annular grooves 61. In attaching my improved device to a rim of the "clencher" type, the members 51 and 52 are adjusted, by the mechanism already described, so as to enable both members being inserted respectively in the grooves 61. The pins 58 are then turned so as to force the members 51 and 52 apart and to the positions shown in Fig. 2, in which position the members 51 and 52 will tightly engage the "clencher" rim. The slots 55 and 56 being disposed at right angles to each other and at an angle of 45 degrees relative to the sides of the members 51 and 52, central openings will always be provided for the insertion of the locking bolts 46. In securing the rim 1 to the members 51 and 52, the screws 50 are removed, and the bolts 46 forced outwardly so as to permit the rim 1 slipping over the "clencher" rim and members 51 and 52. The rim 1 is adjusted to a position in which the bolts 46 will enter the slots 55 and 56, as shown in Fig. 2. The springs 48 will then force the bolts 46 into said slots. The screws 50 are then replaced in the flange 2 and projections 49.

When the device is to be mounted on a flat rim, such as is shown in Figs. 6 and 7, the flat rim 63 is provided with radial holes 62 which are adapted to receive the locking bolts 46.

I do not limit my invention to the structure shown and described, as many modifications, within the scope of the appended claims, may be made without departing from the spirit of my invention.

Having thus described my invention, what I claim and desire to secure by Letters Patent, is:—

1. In a vehicle wheel, an inner rim and an outer rim movable toward and from each other, a radial stud secured to one rim, a sleeve supporting the other rim and having telescopic connection with said stud, a screw threaded member rotatively mounted on said stud, a nut mounted on said screw threaded member, and a spring supported by said nut and supporting said sleeve.

2. In a vehicle wheel, an inner rim and an outer rim movable toward and from each other, a gear wheel rotatively mounted on one of said rims and having a screw threaded hub rotative on a radial axis, a nut mounted on the threaded portion of said hub, and a spring supported by the nut and supporting the other of said rims.

3. In a vehicle wheel, an inner rim and an outer rim movable toward and from each other, a spring supporting one of said rims, a nut supporting said spring, a gear wheel rotative on the other rim around a radial axis and having a screw threaded hub on which the nut is fitted, and a revoluble circular rack engaging said gear wheel.

4. In a vehicle wheel, an inner rim and an outer rim movable toward and from each other, a circular rack revoluble on the inner rim, a gear wheel engaging said rack and rotatively mounted on a radial axis on the inner rim, and having a screw threaded hub, a nut mounted on said hub, and a coil spring supported on said nut and supporting the outer rim.

5. In a vehicle wheel, an inner rim and an outer rim, a stud mounted radially on the inner rim, a sleeve slidable on the stud and supporting the outer rim, a gear wheel rotative on said stud and having a screw threaded hub, a nut mounted on said hub, a spring supported by said nut and supporting said sleeve, and a circular rack revoluble on the inner rim and engaging said gear wheel.

6. In a vehicle wheel, an inner rim and an outer rim movable toward and from each other, a plurality of springs for supporting one rim on the other, a plurality of rotary gear wheels, means by which when said gear wheels are rotated the springs will be respectively varied as to tension, and a circular rack revoluble on one of said rims and meshing with said gear wheels.

7. In a vehicle wheel, an inner rim and an outer rim movable toward and from each other, a plurality of springs for supporting one rim on the other, a plurality of gear wheels rotative on one of said rims, a circular revoluble rack engaging said gear wheels, means for rotating one of said gear wheels, and means for respectively varying the tension of said springs when the wheels are rotated.

8. In a vehicle wheel, an inner rim and an outer rim movable toward and from each other, a plurality of radial studs carried by one rim, a plurality of sleeves respectively slidable on said studs and supporting the other rim, a plurality of springs for respectively supporting said sleeves, a plurality of gear wheels respectively rotative on said studs and having each a screw threaded hub, a plurality of nuts respectively supporting said springs and respectively engaging said hubs, and a circular revoluble rack meshing with said gear wheels.

9. In a vehicle wheel, an inner rim and an outer rim movable toward and from each other, a plurality of springs for supporting one rim on the other, a plurality of gear wheels, means by which when said gear wheels are rotated the tensions of said springs will be varied, a circular rack meshing with said gear wheels, and a plurality of rollers supported on one of said rims and revolubly supporting said rack.

10. In a vehicle wheel, an inner rim, and an outer rim movable toward and from each other, a plurality of springs for supporting one rim on the other, a plurality of gear wheels, means by which when said gear wheels are rotated said springs will be adjusted as to tension, a circular rack meshing with said gear wheels and revoluble around one of said rims, a support adapted to be detachably mounted on one of said rims, a crank shaft rotative in said support, and a driving gear wheel secured to and rotative with said shaft and meshing with one of said gear wheels when the said support is mounted in operative position.

11. In a vehicle wheel, an inner rim and an outer rim movable toward and from each other, a radial stud secured to one rim, a sleeve slidable on the stud and supporting the other rim, a screw threaded member rotatively mounted on the stud, a nut having a threaded engagement with said member, means connecting the sleeve and nut for preventing rotation on one relative to the other, and a spring supported by said nut and supporting said sleeve.

12. In a vehicle wheel, an inner rim and an outer rim movable toward and from each other, a radial stud secured to one rim, a sleeve slidable on the stud and supporting the other rim, a screw threaded member rotative on the stud, a nut mounted on said member, and two members pivoted to each other and to said sleeve and nut respectively for preventing relative rotation of the nut and sleeve.

In testimony whereof I have signed my name to this specification in presence of two subscribing witnesses.

LUTHER L. GREGG, Jr.

Witnesses:
E. B. House,
Florence M. Vendig.

Copies of this patent may be obtained for five cents each, by addressing the "Commissioner of Patents, Washington, D. C."